(12) United States Patent
Schmidt

(10) Patent No.: US 7,898,786 B2
(45) Date of Patent: Mar. 1, 2011

(54) INTRINSICALLY SAFE GALVANICALLY ISOLATED BARRIER DEVICE AND METHOD THEREOF

(75) Inventor: Glen E. Schmidt, Bartlesville, OK (US)

(73) Assignee: Siemens Industry, Inc., Alpharetta, GA (US)

( * ) Notice: Subject to any disclaimer, the term of this patent is extended or adjusted under 35 U.S.C. 154(b) by 773 days.

(21) Appl. No.: 11/845,811

(22) Filed: Aug. 28, 2007

(65) Prior Publication Data

US 2008/0180226 A1      Jul. 31, 2008

Related U.S. Application Data

(60) Provisional application No. 60/897,590, filed on Jan. 26, 2007.

(51) Int. Cl.
*H02H 1/00* (2006.01)

(52) U.S. Cl. ...................................... 361/119

(58) Field of Classification Search ................. 361/111, 361/119
See application file for complete search history.

(56) References Cited

U.S. PATENT DOCUMENTS

| | | | | |
|---|---|---|---|---|
| 4,691,384 A | * | 9/1987 | Jobe ........................... | 398/115 |
| 4,777,375 A | * | 10/1988 | Bozzuto, Jr. .................. | 341/31 |
| 5,136,630 A | * | 8/1992 | Breneman et al. ........... | 455/401 |
| 5,375,454 A | * | 12/1994 | Andrejasich et al. ...... | 73/40.5 R |
| 5,841,648 A | * | 11/1998 | Mansfield .................... | 363/59 |
| 6,037,857 A | | 3/2000 | Behrens et al. | |
| 6,154,679 A | | 11/2000 | Kessler et al. | |
| 6,154,683 A | | 11/2000 | Kessler et al. | |
| 6,404,609 B1 | * | 6/2002 | Mansfield et al. ........... | 361/103 |
| 6,501,200 B2 | * | 12/2002 | Engel et al. ................ | 310/68 R |
| 6,873,065 B2 | | 3/2005 | Haigh et al. | |
| 7,312,716 B2 | * | 12/2007 | Kothari et al. .............. | 340/635 |

OTHER PUBLICATIONS

"IEEE P1451.6 Home Page", downloaded from http://grouper.ieee.org/groups/1451/6/index.htm on Dec. 23, 2009.

(Continued)

*Primary Examiner*—Ronald W Leja
(74) *Attorney, Agent, or Firm*—Filip A. Kowalewski

(57) ABSTRACT

A system and method for providing an intrinsically safe (IS) galvanically isolated barrier device. An IS barrier device provides IS galvanic isolation between a non-IS system and an IS system using a two-stage approach. In the first stage, a non-galvanically isolated IS barrier limits energy of electrical transmissions received from the non-IS system to convert such electrical transmissions into IS transmissions. In the second stage, the IS transmissions are transmitted through a galvanic isolator to the IS system to galvanically isolate the IS system from the non-IS system. A digital monolithic isolator cannot be IS certified to be the single bridge between IS and non-IS systems, however, it can be used in a certifiable fashion to isolate between IS systems. When used in conjunction with a non-galvanic IS barrier that is capable meeting the IS certification as non-IS to IS barrier, a digital monolithic isolator can be used to implement the galvanic isolator such that high speed, low cost galvanic isolation is possible. Such a galvanically isolated barrier device can be used to implement an IS galvanically isolated high speed communication bus for sample system control.

24 Claims, 3 Drawing Sheets

OTHER PUBLICATIONS

"IEEE P1451.6 Scope & Purpose Page", downloaded from http://grouper.ieee.org/groups/1451/6/ScopePurpose.htm on Dec. 23, 2009.

"IEEE P1451.6 PAR Page", downloaded from http://grouper.ieee.org/groups/1451/6/PAR.htm on Dec. 23, 2009.

"IEEE P1451.6 Terms & Definitions Page", downloaded from http://grouper.ieee.org/groups/1451/6/TermsDefinitions.htm on Dec. 23, 2009.

"NeSSI (New Sampling/Sensor Initiative) Generation II Specification", Center of Process Analytical Chemistry, May 26, 2003.

"NeSSI (New Sampling/Sensor Initiative) Generation II Specification", Center of Process Analytical Chemistry, Jun. 21, 2004.

Dubois, Rob et al., "NeSSI—Generation II Revolution or Evolution?", ISA 2001, Houston Texas, Sep. 10, 2001.

"Industrial Automation using the CAN Bux Platform White Paper", Texas Instruments, May 2, 2003.

"Valve Communication Terminals" StoneL Corporation, downloaded from http://www.stonel.com/pdfs.vct_lit.pdf on Apr. 29, 2010.

"I.S. Isolators" pp. 3/50-3/51, downloaded from http://www.mega.ex.com/product_hazardous/Electrical%20Equipment/STAHL/03050051.pdf on Dec. 23, 2009.

"2001 IS Application Guide", Pepperl+Fuchs, Inc., pp. 28-29, downloaded from http://www.am.pepperl-fuchs.com/pdf/documents/fieldbusapplication.pdf on Dec. 23, 2009.

"Fieldbus Repeater for IEC 1158.2", Pepperl + Fuchs Group, downloaded from http://www.moniteurdevices.com/PDF/FF/PowerIS.pdf on Dec. 23, 2009.

"Fieldbus Intrinisically Safe Barrier and Repeater SB312-LP Datasheet", Smar Research Corporation, downloaded from http://www.smar.com/pdf/catalogs/SB312-LPDSB.pdf on Dec. 23, 2009.

"The I2C-Bus Specification", Version 2.1, Phillips Semiconductors, Jan. 2000.

"Profibus Guideline", Version 1.1, Jun. 2003.

"CANopen Intrinisically Safe Capable Physical Layer Specification", CiA Draft Standard Proposal 103, Version 1.0, Mar. 23, 2007.

* cited by examiner

INTRINSICALLY SAFE GALVANICALLY ISOLATED BARRIER DEVICE AND METHOD THEREOF

This application claims the benefit of U.S. Provisional Application No. 60/897,590, filed Jan. 26, 2007, the disclosure of which is herein incorporated by reference.

BACKGROUND OF THE INVENTION

The present invention relates to intrinsic safety, and more particularly to an intrinsically safe galvanically isolated barrier device.

Intrinsic safety is a protection concept deployed in sensitive and potentially explosive atmospheres. Intrinsic safety relies on equipment designed so that it is unable to release sufficient energy, by either thermal or electrical means, to cause an ignition of a flammable gas. Intrinsic safety can be achieved by limiting the amount of power available to the electrical equipment in a hazardous area to a level below that which will ignite the gases. In order to have a fire or explosion, fuel, oxygen and a source of ignition must be present. An intrinsically safe (IS) system that operates in an atmosphere where fuel and oxygen are present is designed such that the electrical energy or thermal energy of a particular instrument loop can never be great enough to cause ignition. There are various IS standards set forth by various certifying agencies for a system to be considered IS. Such standards include International Electrical Commission (IEC) IEC 60079-11, Factory Mutual (FM) 3610, Underwriters Laboratories (UL) UL913, etc.

In many cases, equipment in a hazardous area that is required to be IS, must connect to non-IS equipment located in a non-hazardous area. In these cases, the IS equipment and non-IS equipment can connect through an IS barrier. IS barriers are typically located at a border of a hazardous area and non-hazardous area and ensure that all electrical signals flowing between the non-IS equipment and the IS equipment are IS. Two types of IS barriers available for this purpose are non-galvanically isolated barriers and galvanically isolated barriers.

Non-galvanically isolated barriers are commonly implemented as a diode barrier, typically with an arrangement of fuses, rectifier diodes, resistors, and zener diodes. There are many commercially available IS certified devices on the market from suppliers such as Pepperl+Fuchs, Stahl, Phoenix Contact, MTL, etc. Non-galvanically isolated barriers limit or shunt the available energy from a non-IS system down to levels which are considered safe under IS standards. However, non-galvanically isolated barriers have certain limitations. One such limitation is that a non-galvanically isolated barrier must have a safety ground which provides an infallible connection to an earth ground and the power system ground. Since the barrier is grounded and non-isolated, due to IS requirements for safety, no other point in the IS system may be grounded. This may present challenges to designing a system including many pieces of equipment with various levels of power consumption. Electromagnetic compatibility (EMC) is also much more difficult when local grounding is not possible. The requirement that the non-galvanically isolated barrier be the only grounded point in the IS system also can limit how the IS system is powered. IS power sources are commercially available for use in IS systems, however, the flexibility of use of such devices is greatly reduced when applied in a non-galvanically isolated barrier system. This can lead to high costs and a lack of system flexibility.

Galvanically isolated barriers provide a method of communication between non-IS equipment and IS equipment without any electric current flowing from the non-IS side to the IS side. For example, optical couplers which transmit information as light waves are commonly used in the construction of galvanically isolated barriers in order to provide isolated signal coupling. Such optical couplers may include a light source, such as an LED, and a photosensitive device to receive light emitted from the light source, such as a photoresistor. Unlike non-galvanically isolated barriers, galvanically isolated barrier devices do not need a safety ground. Since galvanically isolated barriers have no low impedance connection between the IS and non-IS equipment, such barriers allow greater flexibility in designing the IS system. Galvanically isolated barriers are commercially available, but typically at greater cost than non-galvanically isolated barriers. However, in many cases, the increased expense can be offset by reduced cost impact to the rest of the system. In addition to cost, typical currently available galvanically isolated barriers have other drawbacks as well. One such drawback is slow data transmission rates. This is due at least in part to the fact that typical galvanically isolated barriers rely on optical coupling, which is inherently slow when compared to state of the art data rates. For example, in current commercially available galvanically isolated barriers, data transmission is limited to approximately 20 kbits/second. Furthermore, separate power sources are often required on both sides (IS and non-IS) of the barrier, so an IS power supply may be used to power equipment on the IS side of the barrier.

In the process control industry, process analysis equipment with associated process sample handling systems are used to monitor and control chemical processes. The New Sample/Sensor Initiative (NeSSI) is an initiative which promotes the use of modular sample system component technology to implement sample systems that are associated with analytical process equipment. NeSSI Generation 2 involves intelligent control of modular sample systems. In order to achieve intelligent control of modular sample systems, two-way communication must be established between the modular devices that make up the sample system and the control device. Accordingly, a digital communication bus can be used to connect the modular devices so that the modular devices can communicate using a protocol. Examples of protocols used to implement NeSSI sample systems include Controller Area Network (CAN), I2C, RS-485 based protocols such as Profibus or Fieldbus, RS-232 protocols, etc.

In process sample systems in which IS modular devices are located in a hazardous area and non-IS devices, such as a sample system controller, are located in a safe area, it is desirable to connect the IS modular devices in the hazardous area with the non-IS devices in the safe area through a serial communication bus. This serial communication bus must connect through an IS barrier located at a border of the safe area and the hazardous area. Due to the disadvantages of non-galvanically isolated barriers and the advantages of galvanically isolated barriers described above, it may be desirable to galvanically isolate the IS devices from the non-IS devices. However, as described above many conventional galvanically isolated IS barriers operate at insufficient data rates to efficiently handle the data demands of modern sample systems, and may increase costs required to implement the sample system. Accordingly, a need exists for a high speed (high date rate), low cost, galvanically isolated barrier for use with a digital communication bus, such as a NeSSI Generation 2 sample system bus. The term NeSSI Generation 2 can be paraphrased as the common mechanical substrates defined by NeSSI with the additional layer of a digital communication bus and power that connects these mechanical devices, the communication layer explicitly meaning Generation 2.

Recently, in order to address the above described need, developments have been made in high speed digital isolator technology. Monolithic integrated circuit isolation devices have been developed that transfer data at rates of greater than 10 Megabits/second through miniature monolithic transformers or capacitors using modulation techniques. These devices are monolithic integrated circuits, and are thus relatively inexpensive. Examples of such devices include the Texas Instruments ISO721 and the Analog Devices ADuM1200, ADuM1300, and ADuM1400 series devices.

BRIEF SUMMARY OF THE INVENTION

The present inventor has discovered that the monolithic integrated circuit isolation devices described above do not meet intrinsic safety (IS) standards when used between an IS circuit and a non-IS circuit. For a barrier device to be considered infallible in accordance with the IEC 60079-11 standard, a minimum spacing of 0.5 mm is required between IS and non-IS circuits. Other IS standards have similar spacing requirements. The internal spacing within the above described monolithic integrated circuit isolation devices is less than the required 0.5 mm. Although these monolithic integrated circuit devices do meet the IEC standard of being infallible between two IS circuits, the monolithic integrated circuit devices may not be used an IS certifiable barrier between a non-IS circuit and an IS circuit. Thus, an inexpensive, high speed galvanically isolated barrier that can be used as an IS connection between a non-IS circuit and an IS circuit is needed.

The present invention provides an intrinsically safe (IS) galvanically isolated barrier device and a method thereof. The galvanically isolated barrier device meets IS standards for connecting a non-IS circuit and an IS circuit. Such a device is usable with process sampling systems as well as other systems which are required to meet IS standards. According to an embodiment of the present invention, such a galvanically isolated barrier device can be used to implement an IS galvanically isolated high speed communication bus for sample system control.

In one embodiment of the present invention, an IS barrier device for providing an IS galvanically isolated connection between a non-IS system and an IS system includes a non-galvanically isolated IS barrier and a galvanic isolator. The non-galvanically isolated IS barrier is capable of connecting to the non-IS system. The galvanic isolator is then connected to the non-galvanically isolated IS barrier to galvanically isolate the non-galvanically isolated barrier and the IS system. According to an embodiment of the present invention, the galvanic isolator can be implemented as a digital monolithic isolator because the galvanic isolator connects two IS circuits (the non-galvanically isolated IS barrier and the IS system). According to an embodiment of the present invention, the non-galvanically isolated IS barrier can be implemented as a diode barrier.

In another embodiment of the present invention, a non-IS digital communication bus and an IS digital communication bus connect through an IS barrier device including a non-galvanically isolated IS barrier and a galvanic isolator. Control signals received at the IS barrier device from a sample system controller via the non-IS digital communication bus can be transmitted through the IS barrier device to at least one IS sample system device via the IS digital communication bus. Also, digital data received from at least one IS sample system device via the IS digital communication bus can be transmitted through the IS barrier device to the sample system controller via the non-IS digital communication bus.

In another embodiment of the present invention, electrical transmissions are received from a non-IS system and converted into IS transmissions. The IS transmissions are then transmitted to an IS system through a galvanic isolator. According to an embodiment of the present invention, the electrical transmissions are converted into the IS transmissions by transmitting the electrical transmissions through a non-galvanically isolated IS barrier.

These and other advantages of the invention will be apparent to those of ordinary skill in the art by reference to the following detailed description and the accompanying drawings.

DETAILED DESCRIPTION

Figure 1:
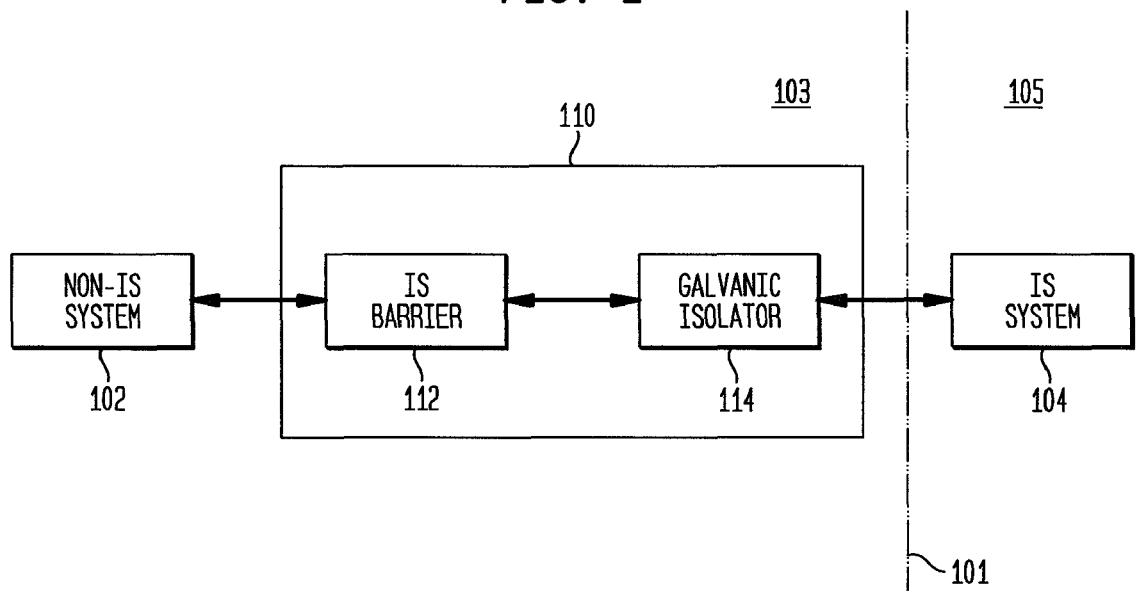
FIG. 1 is a block diagram illustrating an intrinsically safe (IS) barrier device according to an embodiment of the present invention.

The present invention is directed to an intrinsically safe (IS) galvanically isolated barrier device. According to an embodiment of the present invention, such a galvanically isolated barrier device can be used to implement an IS galvanically isolated high speed communication bus for sample system control. FIG. 1 is a block diagram illustrating an IS barrier device 110 according to an embodiment of the present invention. As illustrated in FIG. 1, the IS barrier device 110 is connected to a non-IS system 102 and an IS system 104. The non-IS system 102 is located in a designated safe area 103, and the IS system 104 is located in a hazardous are 105 where explosive and/or flammable gas may be present. According to an advantageous embodiment of the present invention, the IS barrier device 110 is located in the safe area 103 near a border 101 between the safe area 103 and the hazardous area 105. The border 101 is a line separating the safe area 103 from the hazardous area 105. Any equipment located on the hazardous side of the border 101 is required to be IS. The border 101 can be an actual visible line to show where the hazardous area 105 begins, or a hypothetical line formed where the hazardous area 105 meets the safe area 103. Accordingly, the IS system 104 can include various types of IS equipment. The non-IS system 102 can also include various types of equipment, but the equipment in the non-IS system 102 is not required to be IS. As used herein, an IS circuit, system, or device is certifiably infallible based on one or more IS standard, including but not limited to IEC 60079-11, FM 3610, and UL913. As used herein, a non-IS circuit, system, or device does not meet IS standards or is not required to meet IS standards.

The non-IS system 102 communicates with the IS system 104 through the IS barrier device 110. The IS barrier device 110 includes a non-galvanically isolated IS barrier 112 and a galvanic isolator 114. The IS barrier device 110 provides an IS galvanically isolated barrier between non-IS system 102 and the IS system 104. The non-galvanically isolated IS barrier 112 is connected to the non-IS system 102 and receives an electrical transmission from the non-IS system 102. As used herein, the term "electrical transmission" refers to electrical power and/or electrical signals, such as digital data and control signals. The non-galvanically isolated IS barrier 112 limits the energy of the electrical transmission in order to comply with IS standards, and has associated entity parameters. The galvanic isolator 114 is connected between the non-galvanically isolated IS barrier 112 and the IS system 104 to galvanically isolate the non-galvanically isolated IS barrier 112 (and the non-IS system 102) from the IS CAN communication system 106. The isolated barrier 114 is designed within the entity parameter requirements of the non-galvanic barrier, 112.

As described above, the IS barrier device 110 utilizes a two-stage approach for providing IS galvanic isolation. In the first stage, performed by the non-galvanically isolated IS barrier 112, an electrical transmission received from the non-IS system 102 is converted to an IS transmission. Thus, the IS transmission is considered IS compliant, but not galvanically isolated. The non-galvanically isolated barrier 112 could stand alone (without the galvanic isolator 114) to an IS connection between the non-IS system 102 and an IS system 104, however this connection would not be galvanically isolated. In the second stage, the IS transmission is transmitted through the galvanic isolator 114 to the IS system 104, thus galvanically isolating the IS system 104 from the non-IS system 102. The galvanic isolator 114 can be implemented as a monolithic digital isolator, and in such an implementation, it cannot stand alone (without the non-galvanically isolated IS barrier 112) as a fully isolated certifiable IS barrier. As described above, when used alone as a barrier between an IS system and a non-IS system, monolithic digital isolators are not considered infallible in accordance with IS standards. However, monolithic digital isolators are considered infallible under IS standards for galvanic isolation between IS circuits. Thus, when used in conjunction with the non-galvanically isolated IS barrier 112, according to an embodiment of the present invention, the galvanic isolator 114 connects two IS circuits (the non-galvanically isolated IS barrier 112 and the IS system 104), and a digital monolithic isolator can be used to provide IS galvanic isolation. Accordingly, a high speed monolithic digital isolator, such as the Texas Instruments ISO721 and the Analog Devices ADuM1200, ADuM1300, and ADuM1400 series devices, can be used to implement the galvanic isolator 114. Such a monolithic digital isolator provides galvanic isolation by transferring data through miniature monolithic transformers or capacitors using modulation techniques.

The non-galvanically isolated IS barrier 112 can be implemented as a diode barrier and may include an arrangement of fuses, rectifier diodes, resistors, and zener diodes. For example, there are IS certified diode barrier devices commercially available from suppliers such as Pepperl+Fuchs, Stahl, Phoenix Contact, MTL, etc. A diode barrier does not have significant data rate limitations, and therefore will allow high speed data to pass through to the galvanic isolator 114. Although a high speed monolithic digital isolator is used to implement the galvanic isolator 134 in an advantageous embodiment of the present invention, any other type of isolation device that meets IS standards for galvanic isolation between two IS circuits may be alternatively utilized, such as an optical coupler or the like.

Figure 2:
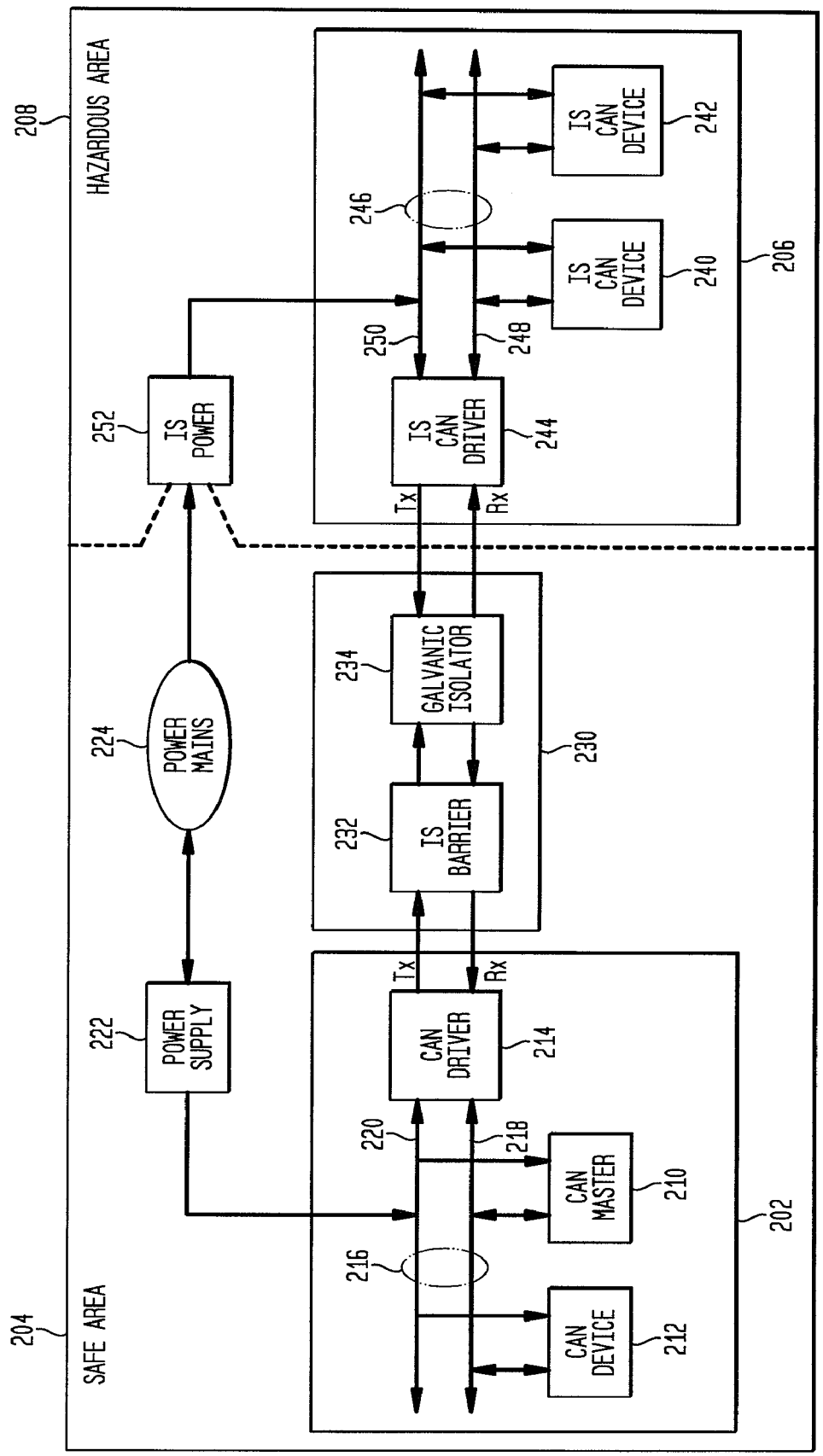
FIG. 2 is a block diagram illustrating a Controller Area Network (CAN) communication system in which non-IS devices communicate with IS devices through an IS galvanically isolated barrier according to an embodiment of the present invention.

FIG. 2 is a block diagram illustrating a Controller Area Network (CAN) communication system in which non-IS devices communicate with IS devices through an IS galvanically isolated barrier according to an embodiment of the present invention. The CAN communication system can be used to implement a NeSSI Generation 2 sample system. Although a CAN system is illustrated in FIG. 2, one skilled in the art will recognize that the present invention can be similarly applied in other protocols used to implement NeSSI sample systems. In addition to sample systems, the IS galvanically isolated barrier device of the present invention can be used to connect any IS circuit or system to any non-IS circuit or system.

As illustrated in FIG. 2, a non-IS CAN system 202 is located in a safe area 204, and an IS CAN system 206 is located in a hazardous area 208. The hazardous area 208 can be an area where explosive and/or flammable gas is present and all electrical equipment is required to be IS. The safe area 204 does not require electrical equipment to be IS. The non-IS CAN system 202 of FIG. 2 includes a CAN master 210, a CAN device 212, and a CAN driver 214 which are connected to a non-IS digital communication bus 216. The digital communication bus 216 can be a serial bus for bi-directional transmitting of digital data and electrical power. The CAN master 210 is a sample system manager that controls data flow on the digital communication bus 216. The CAN driver 214 is controlled by the CAN master 210 to drive the CAN device 212 to transmit and receive data via the digital communication bus 216. The CAN device 212 is a type of sample system device. In FIG. 2, the CAN devices (212, 240, 242) are self contained measurement and control devices that may be as simple as a pressure or temperature sensor that can report a measurement, or a valve that responds to commands over the bus, or as complex as a device that measures parameters and controls pressure, flow and/or temperature. The NeSSI Generation 3 vision would even have these devices operating as fully self-contained analytical measurement equipment. Under the CAN protocol, each device has a unique device address, that distinguishes the device from any other device on the some bus. The CAN Master (210) presides over the bus to arbitrate between the slave devices (212, 240, 242). The CAN drivers (214, 244) convert the data into a bidirectional differential transmit (Tx) and receive (Rx) electrical signal pair with defined voltage and current characteristics per the CAN standard. The digital communication bus 216 can include a data segment 218 for transmitting digital data and a circuit 220 for supplying power. The circuit 220 of the serial bus can receive power from a power supply 222, which can be powered by a power mains 224. For example, the power mains 224 can be a low voltage (24VDC or equivalent) power system or an AC main power source, such as 115VAC or 230VAC.

The non-IS digital communication bus 216 of the non-IS CAN communication system 202 connects to an IS barrier device 230 which is located at a border of the safe area 204 and the hazardous area 208. The non-IS CAN communication system 202 communicates with the IS CAN communication system 206 through the IS barrier device 230. The IS barrier device 230 includes a non-galvanically isolated IS barrier 232 and a galvanic isolation barrier 234. The IS barrier device provides an IS galvanically isolated barrier between non-IS CAN communication system 202 in the safe area 204 and the IS CAN communication system 206 in the hazardous area 208. The non-galvanically isolated IS barrier 232 is connected to the serial bus 216 of the non-IS CAN communication system 202 and receives power and digital data signals from the serial bus 216 through CAN driver 214. The non-galvanically isolated IS barrier 232 limits the energy of the power and digital data signals, thus outputting signals that comply with IS standards. The galvanic isolator 234 is connected between the non-galvanically isolated IS barrier 232 and the IS CAN communication system 206 to galvanically isolate the non-galvanically isolated IS barrier 232 (and the non-IS CAN communication system 202) from the IS CAN communication system 206.

As described above, according to an embodiment of the present invention, the IS barrier device 230 utilizes the non-galvanically isolated IS barrier 232 in series with the galvanic isolator 234 in order to perform a two-stage approach for providing IS galvanic isolation that meets all IS requirements. As described above, the galvanic isolator 234 may be implemented as a monolithic digital isolator and the non-galvanically isolated IS barrier 232 may be isolated as a diode barrier.

A safety ground must run from the non-galvanically isolated IS barrier 232 to a power source, such as the AC main 224. According to an embodiment of the present invention, the IS barrier device 230 can be located in the safe area 204 adjacent to the border between the safe area 204 and the hazardous area 208.

The IS CAN communication system 206 includes IS CAN devices 240 and 242 and an IS CAN driver 244, which are connected to an IS digital communication bus 246. The IS CAN devices 240 and 242, IS CAN driver 244 and IS serial bus 246 comply with IS standards, and thus can safely operate in the hazardous area 208. The IS digital communication bus 246 connects (through the IS CAN driver 244) with the galvanic isolator 234 of the IS barrier device 230. The IS CAN driver 244 drives IS CAN devices 240 and 242. The IS CAN driver 244 can control the IS CAN devices 240 and 242 in response to control signals transmitted through the IS barrier device 230 from the CAN master 210. The IS CAN devices 240 and 242 are sample system devices that transmit digital data via the IS digital communication bus 246, and the IS CAN driver 244 transmits the digital data through the IS barrier device 230, so that the data can be transmitted to the CAN master 210 or CAN device 212 via the non-IS digital communication bus 216. The IS digital communication bus 246 can be implemented as a serial bus. The IS digital communication bus 246 includes a data segment 248 for transmitting digital data and a power circuit 250 for supplying power to the IS CAN devices 240 and 242. The data segment 248 and the power circuit 250 and IS Power Supply 252 comply with IS standards, and have entity parameters which are applied in compliance to IS standards. The power circuit 250 of the IS digital communication bus 246 can be connected to an IS power supply 252, which is the only source of power on the isolated side. IS certified power supplies having various entity parameters are commercially available.

Figure 3:
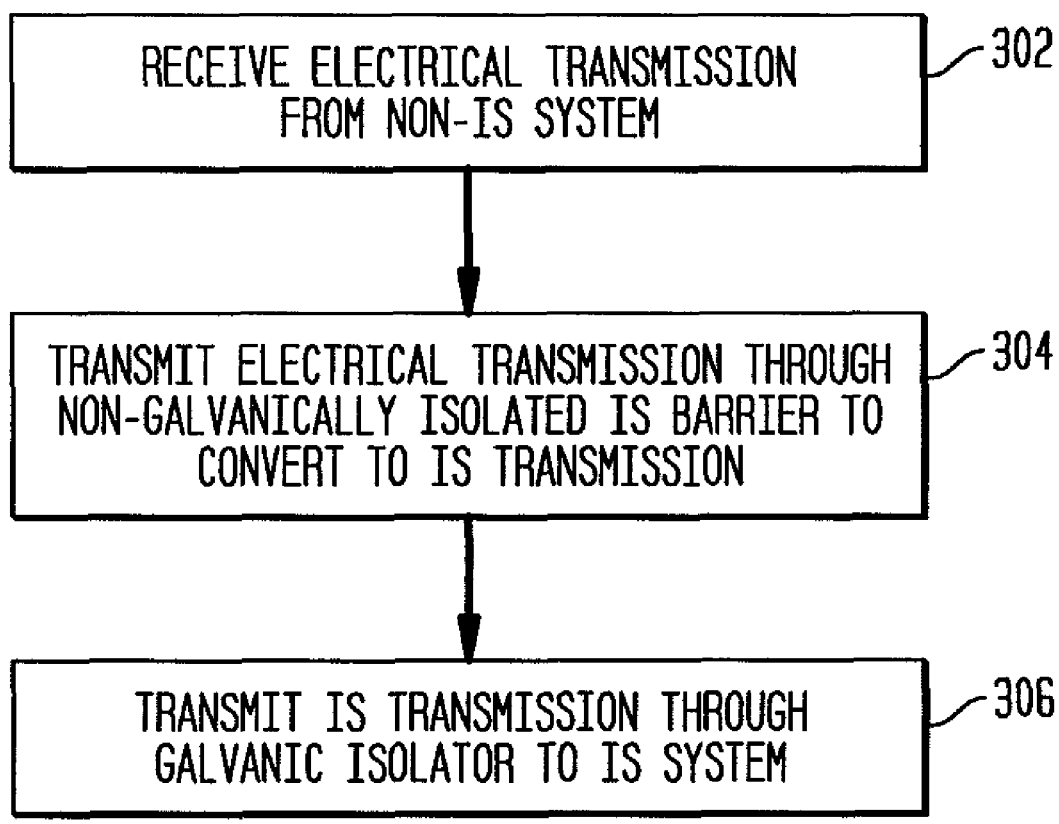
FIG. 3 is a flowchart illustrating a method of IS galvanic isolation according to an embodiment of the present invention.

FIG. 3 is a flow chart illustrating a method of IS galvanic isolation according to an embodiment of the present invention. FIG. 3 will be described while referring to FIG. 1. At step 302, an electrical transmission is received at the IS barrier device 110 from a non-IS system 102. As described above, an "electrical transmission" can include electrical power and/or electrical signals, such as digital data and control signals. At step 304, the electrical transmission is transmitted through the non-galvanically isolated IS barrier 112 in order to convert the electrical transmission to an IS transmission. The non-galvanically isolated IS barrier 112 limits the energy in the electrical transmission in order to comply with IS standards. At step 306, the IS transmission is transmitted through the galvanic isolator 114 to an IS system 104. As described above, the galvanic isolator 114 can be implemented as a digital monolithic isolator, although such devices cannot be considered infallible between an IS circuit and a non-IS circuit in accordance with accepted standards for intrinsic safety, because the internal spacing does not meet the required minimum amount. For example, IEC 600079-11, section 8.8, paragraph 2 specifies that a minimum internal distance required between IS and non-IS circuits is 0.5 mm. However, according to IEC 600079-11, section 8.8, paragraph 1, these digital monolithic isolators can be considered infallible between IS circuits, because they meet the requirement of IEC 600079-11, section 8.8 (a) and they are tested in accordance with IEC 600079-11, section 8.8 (b). Thus, the IS system 104 receives an IS compliant transmission and is galvanically isolated from the non-IS system 102.

As described above, a galvanic isolator is used in conjunction with a non-galvanically isolated IS barrier as an IS galvanically isolated barrier. Since the galvanic isolator is connected between the non-galvanically isolated IS barrier (which is an IS circuit) and an IS system, the galvanic isolator connects two IS circuits. Thus, the problem with conventional solutions using a high speed digital monolithic isolator to connect a non-IS system and an IS system are solved. Accordingly, a high speed digital monolithic isolator can be used to implement the galvanic isolator in accordance with IS standards according to an embodiment of the present invention. Furthermore, a non-IS digital communication bus and an IS digital communication bus can be connected through the IS barrier device according to an embodiment of the present invention, forming an IS galvanically isolated high speed communication bus that is usable for sample system control and various other applications.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. An apparatus for providing an intrinsically safe (IS) galvanically isolated connection between a non-IS system and an IS system, comprising:
   a non-galvanically isolated IS barrier adapted to connect to a non-IS system and adapted to limit energy of a non-IS electrical transmission received from the non-IS system to convert the non-IS electrical transmission into an IS electrical transmission;
   a galvanic isolator connected to the non-galvanically isolated IS barrier, adapted to connect to an IS system for providing galvanic isolation between the non-galvanically isolated IS barrier and the IS system, and adapted to transmit said IS electrical transmission via non-galvanic communication to a plurality of devices in the IS system.

2. The apparatus of claim 1, wherein said galvanic isolator comprises a digital monolithic isolator.

3. The apparatus of claim 2, wherein said digital monolithic isolator is considered infallible between IS systems in accordance with an IS standard, and not considered infallible to separate an IS system and a non-IS system in accordance with the IS standard, wherein the IS standard is one of International Electrical Commission (IEC) IEC 60079-11, Factory Mutual (FM) 3610, and Underwriters Laboratories (UL) UL913.

4. The apparatus of claim 1, wherein said non-galvanically isolated IS barrier comprises a diode barrier.

5. The apparatus of claim 1, wherein said non-galvanically isolated IS barrier is capable of providing IS separation between the non-IS system and the IS system in accordance with an IS standard without said galvanic isolator, wherein the IS standard is one of International Electrical Commission (IEC) IEC 60079-11, Factory Mutual (FM) 3610, and Underwriters Laboratories (UL) UL913.

6. The apparatus of claim 1, wherein said galvanic isolator comprises an optical coupler.

7. The apparatus of claim 1, further comprising:
a non-IS device driver connected between the non-IS system and the non-galvanically isolated IS barrier for driving devices in the non-IS system using a communication protocol; and
an IS device driver connected between the galvanic isolator and the plurality of devices in the IS system for driving the plurality of devices in the IS system using said communication protocol based on said IS electrical transmission transmitted via non-galvanic communication by the galvanic isolator.

8. The apparatus of claim 7, wherein said communication protocol is CAN (Controller Area Network).

9. The apparatus of claim 1, further comprising:
an IS power supply adapted to supply power to the plurality of devices in the IS system;
a non-IS power supply adapted to supply power to the non-IS system, wherein the non-IS power supply is galvanically isolated from the IS system by the galvanic isolator.

10. A system comprising:
a non-intrinsically safe (IS) digital communication bus;
an IS digital communication bus connected to a plurality of IS sample system devices; and
an IS barrier device connecting the non-IS digital communication bus and the IS digital communication bus, the IS barrier device comprising,
a non-galvanically isolated IS barrier connected to the non-intrinsically safe digital communication bus, and
a galvanic isolator connected between the non-galvanically isolated IS barrier and the intrinsically safe digital communication bus.

11. The system of claim 10, further comprising:
a sample system controller connected to the non-intrinsically safe digital communication bus.

12. The system of claim 11, wherein the IS barrier device is adapted to transmit control signals received from the sample system controller via the non-intrinsically safe digital communication bus to the plurality of IS sample system devices via the IS digital communication bus.

13. The system of claim 12, wherein the non-galvanically isolated IS barrier is adapted to convert the control signals to intrinsically safe signals, and the intrinsically safe signals are transmitted through the galvanic isolator to the intrinsically safe digital communication bus.

14. The system of claim 11, wherein the IS barrier device is adapted to transmit digital data received from the plurality of IS sample system devices via the IS digital communication bus to the sample system controller via the non-intrinsically safe digital communication bus.

15. The system of claim 11, further comprising:
an intrinsically safe power supply connected to the IS digital communication bus to supply power to the plurality of IS sample system devices; and
a non-intrinsically safe power supply connected to the non-IS digital communication bus to supply power to the sample system controller, wherein the non- intrinsically safe power supply is galvanically isolated from the IS digital communication bus by the galvanic isolator of the IS barrier device.

16. The system of claim 10, wherein said non-galvanically isolated IS barrier meets all requirements for providing IS separation between a non-IS system and an IS system in accordance with an IS standard, wherein the IS standard is one of International Electrical Commission (IEC) IEC 60079-11, Factory Mutual (FM) 3610, and Underwriters Laboratories (UL) UL913.

17. The system of claim 10, wherein said galvanic isolator is considered infallible between IS systems in accordance with an IS standard, and not considered infallible to separate an IS system and a non-IS system in accordance with the IS standard, wherein the IS standard is one of International Electrical Commission (IEC) IEC 60079-11, Factory Mutual (FM) 3610, and Underwriters Laboratories (UL) UL913.

18. The system of claim 10, wherein said galvanic isolator comprises a digital monolithic isolator.

19. The system of claim 10, wherein said non-galvanically isolated IS barrier comprises a diode barrier.

20. A method comprising:
receiving an electrical transmission from a non-intrinsically safe (IS) system;
converting said electrical transmission into an IS transmission; and
transmitting said IS transmission to a plurality of devices of an IS system through a single galvanic isolator.

21. The method of claim 20, wherein said step of converting said electrical transmission into an IS transmission comprises:
transmitting said electrical transmission through a non-galvanically isolated IS barrier.

22. The method of claim 21, wherein said non-galvanically isolated IS barrier comprises a diode barrier.

23. The method of claim 20, wherein said step of converting said electrical signal into an IS electrical signal comprises:
reducing an amount of energy in said electrical transmission.

24. The method of claim 20, wherein said galvanic isolator comprises a digital monolithic isolator.

* * * * *